United States Patent
Fuma et al.

(10) Patent No.: US 11,104,292 B2
(45) Date of Patent: Aug. 31, 2021

(54) SIDE AIRBAG DEVICE

(71) Applicant: Autoliv Development AB, Vargarda (SE)

(72) Inventors: Makoto Fuma, Kanagawa (JP); Yuto Kobayashi, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/613,890

(22) PCT Filed: May 8, 2018

(86) PCT No.: PCT/JP2018/017817
§ 371 (c)(1),
(2) Date: Nov. 15, 2019

(87) PCT Pub. No.: WO2018/212021
PCT Pub. Date: Nov. 22, 2018

(65) Prior Publication Data
US 2021/0024030 A1    Jan. 28, 2021

(30) Foreign Application Priority Data
May 17, 2017   (JP) .............................. JP2017-097841

(51) Int. Cl.
*B60R 21/2338*   (2011.01)
*B60R 21/207*   (2006.01)
(Continued)

(52) U.S. Cl.
CPC ........ *B60R 21/2338* (2013.01); *B60R 21/207* (2013.01); *B60R 21/233* (2013.01);
(Continued)

(58) Field of Classification Search
CPC .............. B60R 21/2338; B60R 21/207; B60R 2021/23146; B60R 21/233; B60R 21/23138; B60R 2021/23382
See application file for complete search history.

(56) References Cited

U.S. PATENT DOCUMENTS 9,505,374 B2   11/2016   Matsuzaki et al.
9,796,351 B2   10/2017   Fujiwara
(Continued)

FOREIGN PATENT DOCUMENTS

| | | |
|---|---|---|
| JP | 2016007902 A | 1/2016 |
| JP | 2016083955 A | 5/2016 |

OTHER PUBLICATIONS

International Search Report of the International Searching Authority for PCT/JP2018/017817 dated Jul. 3, 2018. [See English Machine Translation].

*Primary Examiner* — Darlene P Condra
(74) *Attorney, Agent, or Firm* — Stephen T. Olson; Harness, Dickey & Pierce, P.L.C.

(57) ABSTRACT

Problem: To provide a side airbag device that can improve restraint performance by efficiently suppressing oscillation of an airbag cushion. Resolution Means: A side airbag device 100 is provided with: a vertically long rear chamber 116, a front chamber 118 that is inflated and deployed forward and upward from the rear chamber 116, an inflator 108 contained within a rear part of the rear chamber 116, and a cloth-like first tether 112 that is provided outside of the rear chamber 116, has a front end 122 connected to a front edge portion 124 of the rear chamber 116, and has a rear end 126 connected to the rear part of the rear chamber 116, and which is tensioned when the rear chamber 116 is inflated and deployed. The rear chamber 116 has a smaller capacity than the front chamber 118, the first tether 112 is longer in the vertical direction than in the front-back direction, and the (Continued)

front end 122 of the first tether 112 is connected to a range that includes at least a lower end 146 of the front edge portion 124 of the rear chamber 116.

18 Claims, 6 Drawing Sheets

(51) Int. Cl.
*B60R 21/231* (2011.01)
*B60R 21/233* (2006.01)

(52) U.S. Cl.
CPC ............... *B60R 21/23138* (2013.01); *B60R 2021/23146* (2013.01); *B60R 2021/23382* (2013.01)

(56) References Cited

U.S. PATENT DOCUMENTS

| | | | |
|---|---|---|---|
| 2008/0290637 A1* | 11/2008 | Mueller | B60R 21/207 280/736 |
| 2011/0049852 A1* | 3/2011 | Kibat | B60R 21/23138 280/743.2 |
| 2012/0049498 A1* | 3/2012 | Wiik | B60R 21/23138 280/743.2 |
| 2015/0367803 A1 | 12/2015 | Fujiwara | |
| 2016/0114755 A1 | 4/2016 | Matsuzaki et al. | |
| 2016/0114757 A1* | 4/2016 | Fujiwara | B60R 21/233 280/729 |
| 2016/0159313 A1* | 6/2016 | Fujiwara | B60R 21/23138 280/729 |
| 2018/0222435 A1* | 8/2018 | Fukawatase | B60R 21/2338 |

\* cited by examiner

[FIGS. 1]
(a)
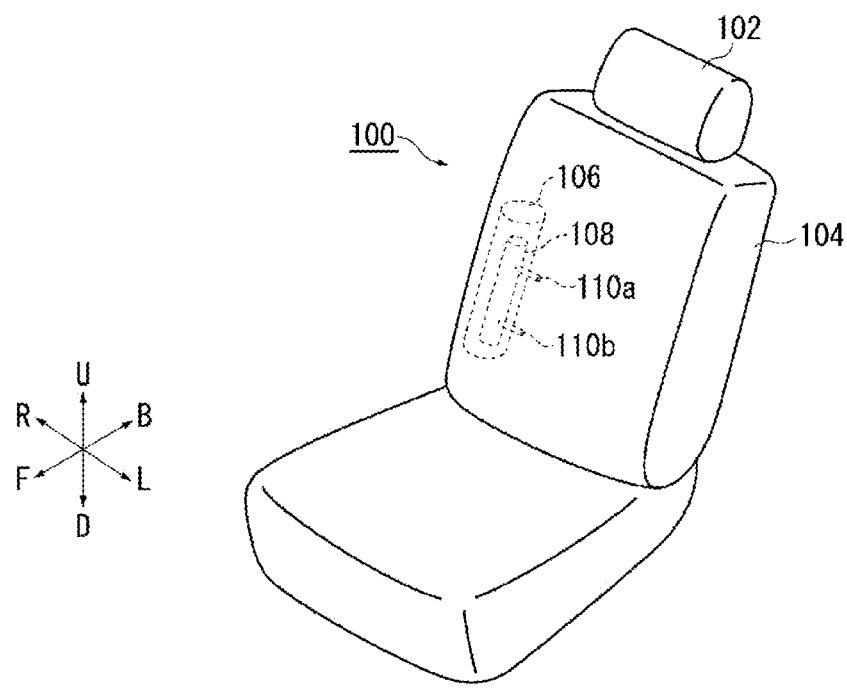
(b)
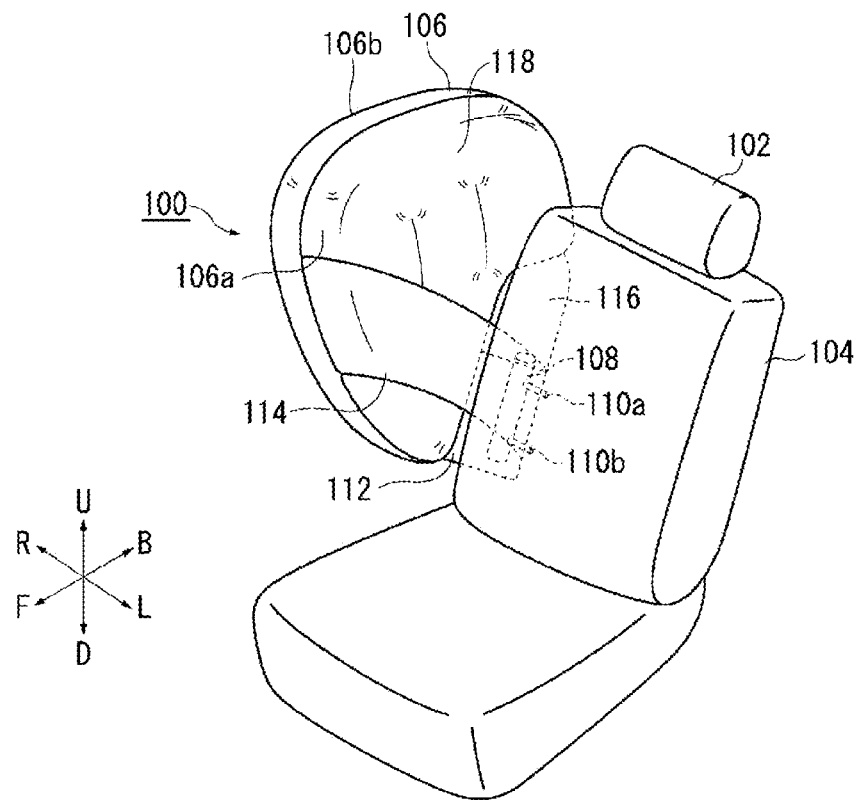

[FIGS. 2]
(a)
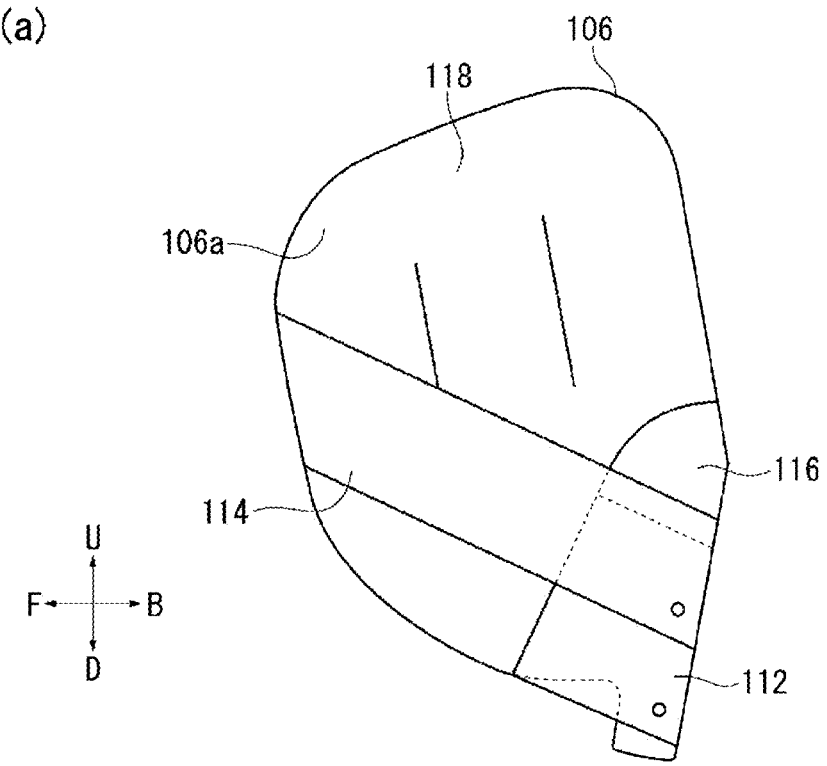
(b)
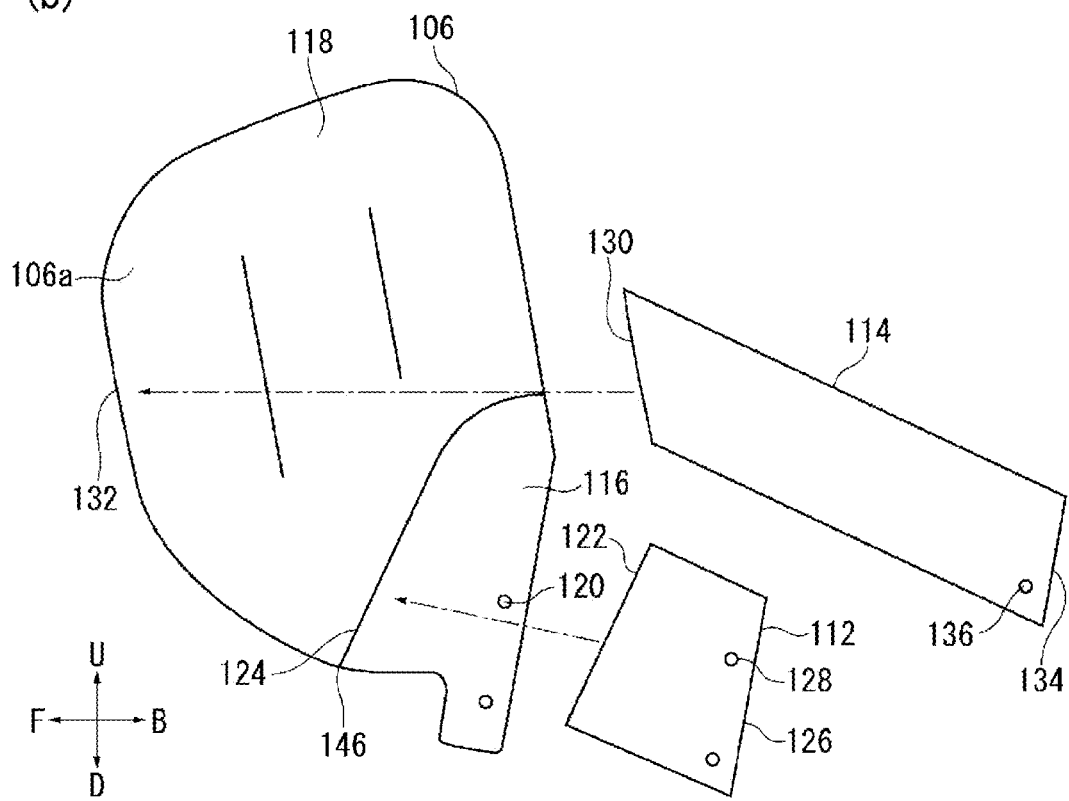

[FIG. 3]
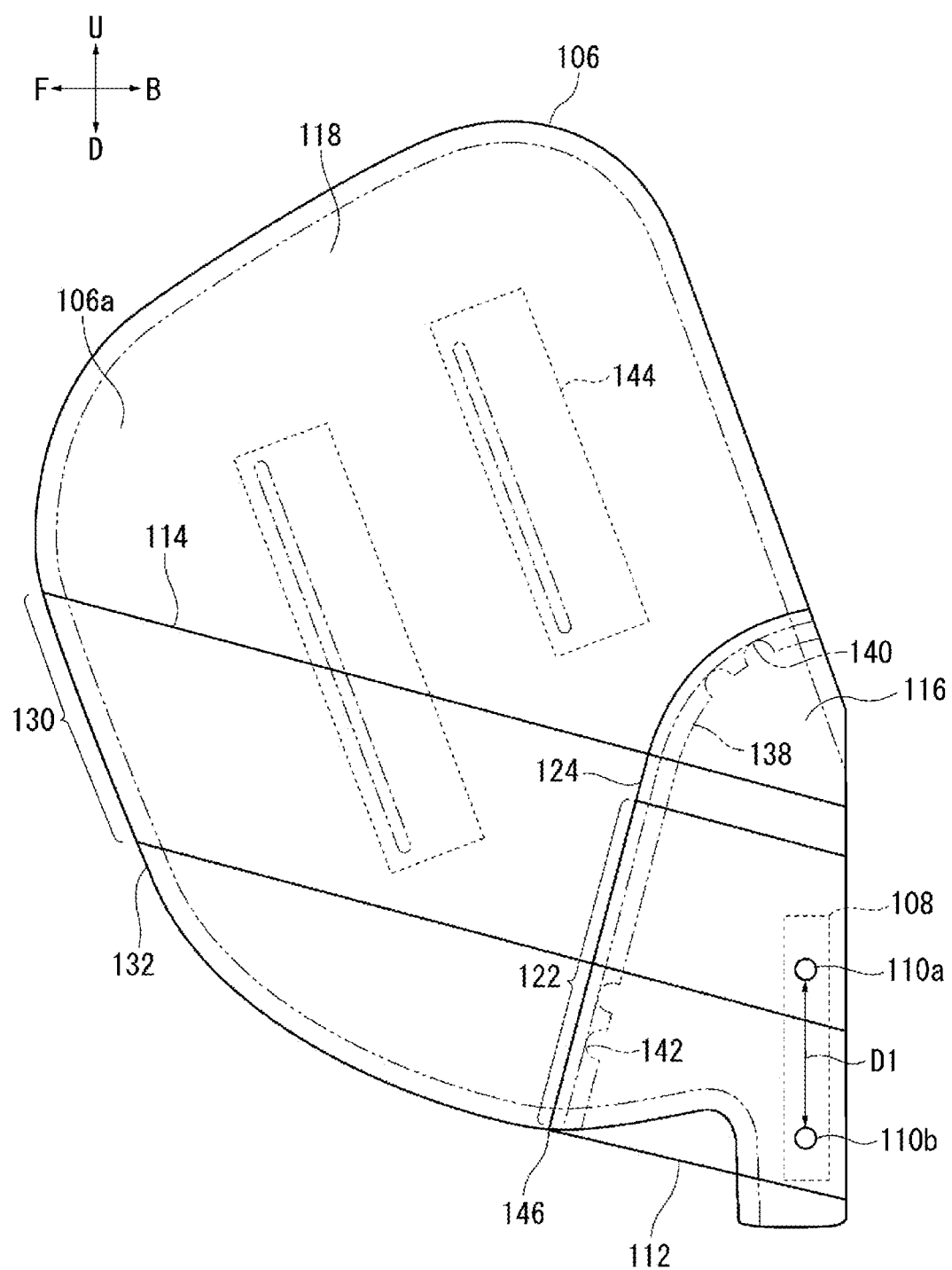

[FIG. 4]
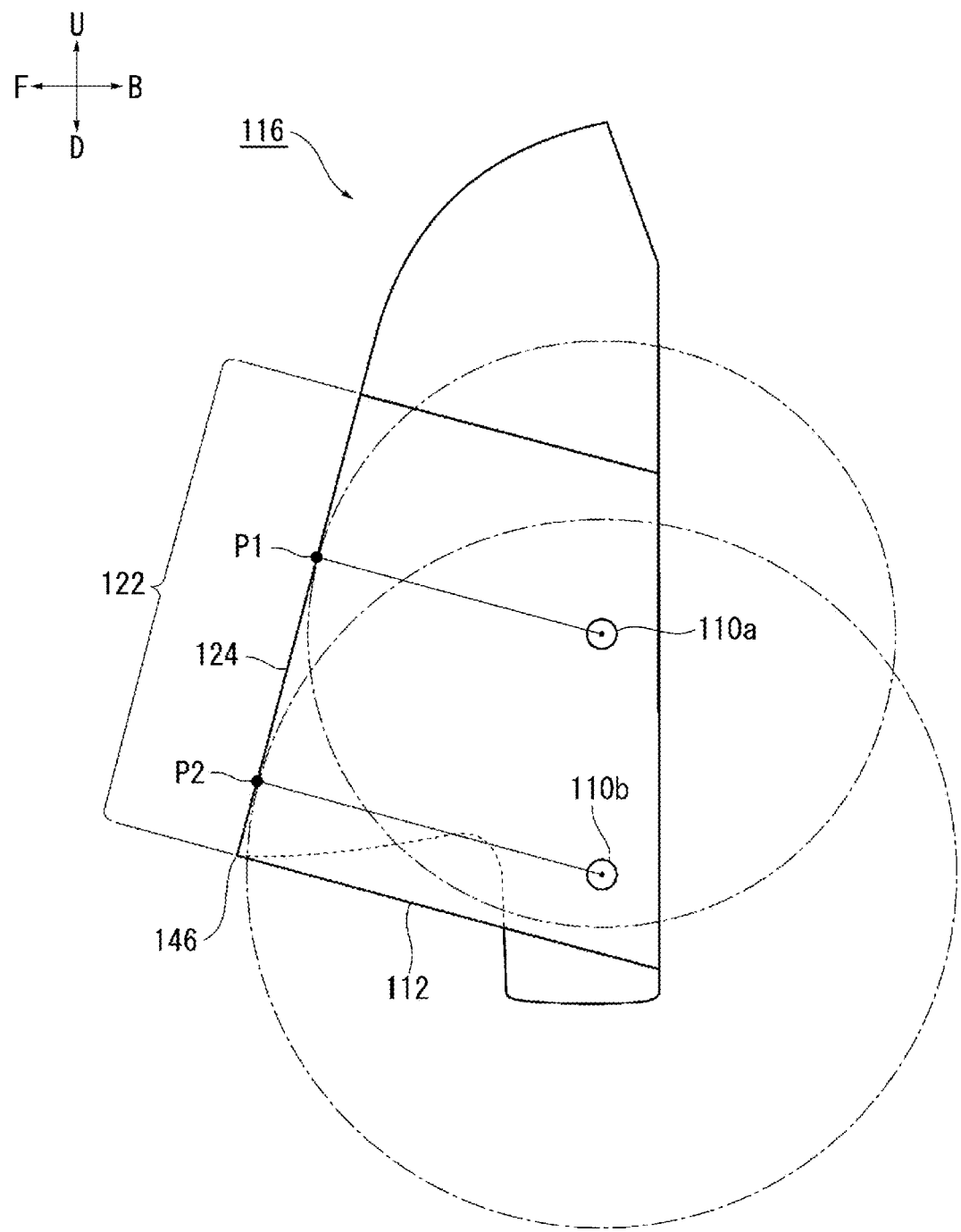

[FIGS. 5]
(a)
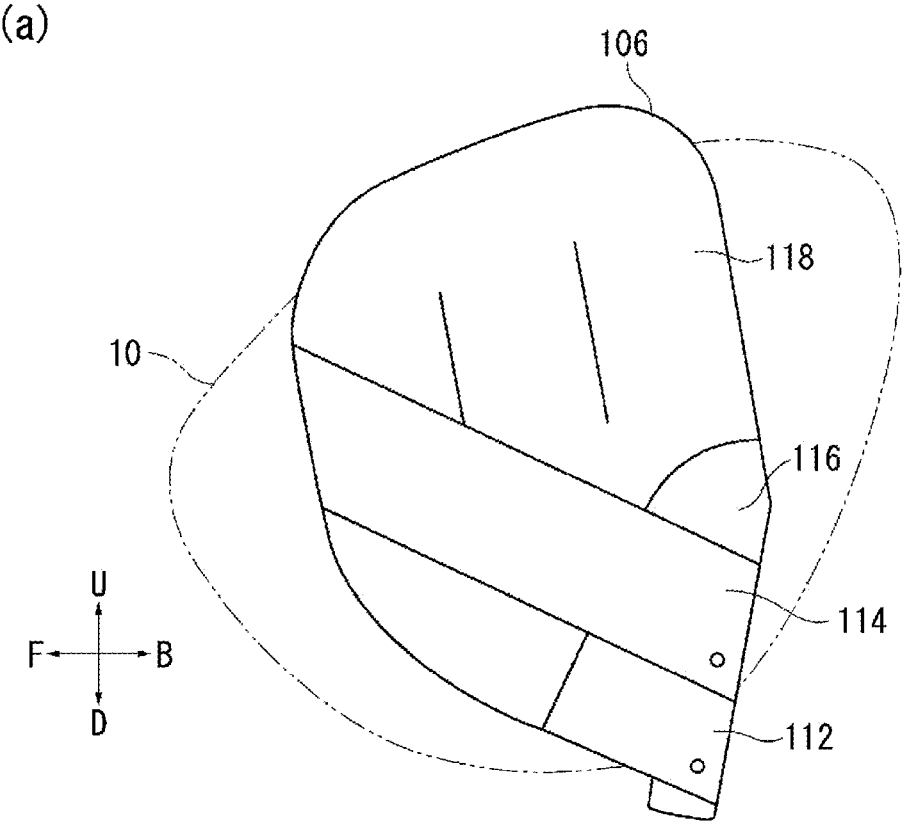
(b)
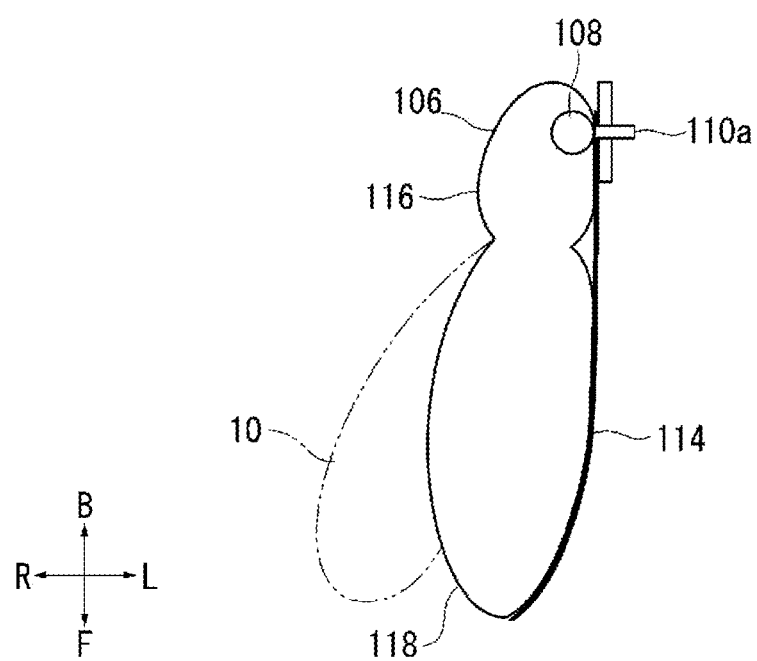

[FIG. 6]
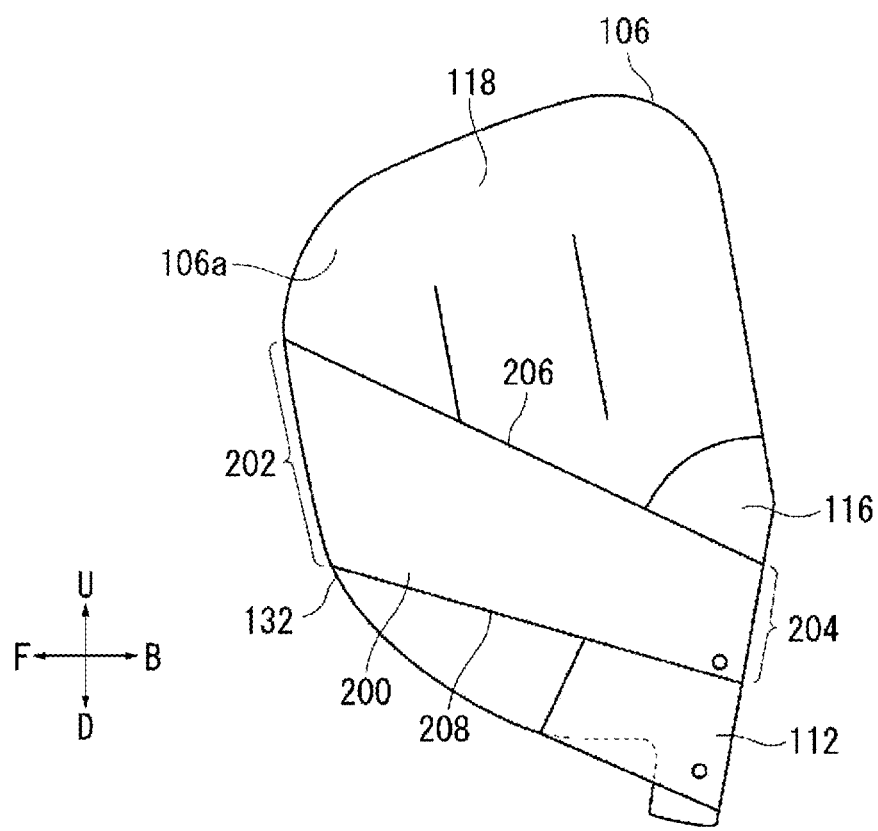

SIDE AIRBAG DEVICE

TECHNICAL FIELD

The present invention relates to a side airbag device that restrains an occupant of a vehicle from the side.

BACKGROUND

Airbag devices have generally become standard equipment in vehicles in recent years. An airbag device is a safety device that is operated in the event of an emergency such as a vehicle collision to receive and protect a passenger by inflating and deploying an airbag cushion with gas pressure.

There are various types of airbag devices depending on the installation site and application. For example, a front airbag device is provided in the center of a steering wheel to protect the driver from a collision in the front-back direction. In addition, to protect the occupant from an impact from a vehicle width direction due to a side-impact collision or the like, a curtain airbag device is provided near a ceiling above a side window, and a side airbag device is provided in a side portion of the seat.

It is desirable that the airbag cushion be able to inflate and deploy more smoothly in order to improve restraint performance. For example, with the side-impact collision airbag device (side airbag) described in Patent Document 1, a strap 60 (an upper strap portion 61 and a lower strap portion 65) is provided outside of an airbag 40 to inhibit unnecessary movement of the airbag 40.

RELATED ART DOCUMENTS

Patent Documents

Patent Document 1: Japanese Unexamined Patent Application Publication No. 2016-83955

SUMMARY OF THE INVENTION

Problem to be Solved by the Invention

Patent Document 1 describes that tensioning of the strap regulates movement of the airbag such that the airbag rotates toward the front of the vehicle when inflated and deployed. However, the strap of Patent Document 1 is a band-like member that is long in the front-back direction, and there is a concern that the strap could become loose, and thus there is room for improvement to efficiently apply tension to the airbag.

In light of the problems described above, an object of the present invention is to provide a side airbag device that can improve restraint performance by efficiently suppressing oscillation of the airbag cushion.

Means for Solving the Problem

In order to solve the above problems, a representative configuration of a side airbag device according to the present invention is provided with: a vertically long rear chamber that inflates and deploys from a side portion of a vehicle seat; a front chamber that abuts a front edge portion of the rear chamber and inflates and deploys forward and upward from the rear chamber; a vertically long inflator contained within a rear part of the rear chamber; and a cloth-like first tether that is provided outside of the rear chamber, has a front end connected to the front edge portion of the rear chamber and a rear end connected to the rear part of the rear chamber, and is tensioned when the rear chamber is inflated and deployed. Herein, the rear chamber has a smaller capacity than the front chamber; the first tether is longer in a vertical direction than in a front-back direction, and the front end of the first tether is connected to a range that includes at least a lower end of the front edge portion of the rear chamber.

The first tether is configured to be shorter in the front-back direction, and therefore is more strongly tensioned in the front-back direction. Also, because the first tether is long in the vertical direction, the edge of the front end is also vertically long, and can be connected over a long range with the rear chamber. With such a first tether, tension can be efficiently applied to the rear chamber, and movement of the rear chamber in the front-back direction can be efficiently restricted. Here, the rear chamber is a portion that contains the inflator and is positioned at the base of the entire airbag cushion. The rear chamber is also small in capacity and quickly reaches a high pressure state immediately after operation of the inflator. Thus, the first tether is also rapidly and strongly tensioned. Accordingly, with the configuration described above, the first tether supports the rear chamber of the base of the airbag cushion with a strong tension, and thereby prevents oscillation of the entire airbag cushion, and improves the restraint performance of the airbag cushion.

The side airbag device may further include a cloth-like second tether that is provided outside of the front chamber and the rear chamber, has a front end connected to a front edge portion of the front chamber and a rear end connected to a rear part of the rear chamber, and is tensioned when the rear chamber is inflated and deployed.

By providing the second tether described above, oscillation in the vehicle width direction originating at the boundary between the front chamber and the rear chamber can be prevented.

The second tether may be longer in the front-back direction than in the vertical direction. Through such a configuration, a second tether that can prevent oscillation of the front chamber can be realized.

The front end of the second tether above may be connected to the front edge portion of the front chamber in a range that is longer than a range in which the rear end of the second tether is connected to the rear part of the rear chamber. Through this configuration, the second tether can efficiently pull the front chamber and prevent oscillation thereof.

The length from the front end to the rear end of the second tether above may be shorter than a length of a path extending from the front edge portion of the front chamber to the rear part of the rear chamber when the front chamber and the rear chamber are inflated and deployed without bending. A second tether of this length can be efficiently tensioned in accordance with the inflation and deployment of the front and rear chambers.

The side airbag device may further include two stud bolts provided longitudinally spaced apart at the inflator, exposed from the rear chamber, and fastened to the vehicle seat, and the rear end of the first tether may be anchored to the rear part of the rear chamber across the two stud bolts. Through this configuration, the first tether can be efficiently tensioned.

The front end of the first tether preferably has a length greater than or equal to a distance between the two stud bolts. By configuring the first tether in this manner, tension can be efficiently applied to the rear chamber.

The front end of the first tether described above is preferably connected to a range of the front edge portion of the rear chamber, the range including a location of the shortest distance to the stud bolts. By configuring the first tether in this manner, tension can be efficiently applied to the rear chamber.

The side airbag device may further include two stud bolts provided longitudinally spaced apart at the inflator, exposed from the rear chamber, and fastened to the vehicle seat, and the rear end of the second tether is preferably anchored by at least one of the two stud bolts at the rear part of the rear chamber. Through this configuration, the second tether can be efficiently tensioned to apply tension to the front chamber.

Effects of the Invention

According to the present invention, a side airbag device that can improve restraint performance by efficiently suppressing the oscillation of an airbag cushion can be provided.

BRIEF DESCRIPTION OF THE DRAWINGS

FIGS. 1A and 1B are views illustrating an example of a side airbag device according to an embodiment of the present invention.

FIGS. 2A and 2B are side views of the airbag cushion of FIG. 1B.

FIG. 3 is a detailed view of the airbag cushion of FIG. 1A.

FIG. 4 is an enlarged view near a rear chamber of FIG. 3.

FIGS. 5A and 5B are views illustrating the conditions when the airbag cushion of FIG. 1A is inflated and deployed.

FIG. 6 illustrates a modified example of the second tether of FIGS. 2A and 2B.

REFERENCE NUMERALS

100: Side airbag device, 102: seat, 104: seat back, 106: cushion, 106a: left side main panel, 106b: right side main panel, 108: inflator, 110a: upper stud bolt, 110b: lower stud bolt, 112: first tether, 114: second tether, 116: rear chamber, 118: front chamber, 120: rear chamber bolt hole, 122: front end of first tether, 124: front edge portion of rear chamber, 126: rear end of first tether, 128: first tether bolt hole, 130: front end of second tether, 132: front edge portion of front chamber, 134: rear end of second tether, 136: bolt hole of second tether, 138: baffle, 140, 142: vent hole, 144: inner tether, 146: lower end of front edge portion of rear chamber, 200: modified second tether, 202: front end of modified second tether, 204: rear end of modified second tether, 206: upper side of modified second tether, 208: lower side of modified second tether, D1: distance between stud bolts, 10: conventional cushion.

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention.

FIGS. 1A and 1B are views illustrating an example of a side airbag device according to an embodiment of the present invention. FIG. 1A illustrates, from a right side in the vehicle width direction, or in other words, from the outside in the vehicle width direction (vehicle outer side), a side airbag device 100 and a vehicle left side seat 102 in which the side airbag device 100 is incorporated. In FIG. 1A and all other drawings of the present application, the vehicle forward and back directions are illustrated with respective arrows F (forward) and B (back), left and right in the vehicle width direction are illustrated by respective arrows L (left) and R (right), and the vehicle vertical direction is illustrated by respective arrows U (up) and D (down).

As illustrated in FIG. 1A, the side airbag device 100 is installed inside a seat back 104 at the inner side in the vehicle width direction (vehicle inner side) of the seat 102 in the present embodiment. The side airbag device 100 is configured including an airbag cushion (cushion 106) that restrains the occupant and an inflator 108 that delivers gas to the cushion 106. The cushion 106 is wound or folded prior to operation, and is housed in a housing or such built into the side portion of the seat back 104 at the vehicle inner side. The cushion 106 in the housed state is covered with a seat cover, etc. and therefore is not visible from the outside.

The inflator 108 is a gas generating device, and in the embodiments, a cylinder-shaped (cylindrical) inflator is adopted. The inflator 108 is contained in a rear part of a rear chamber 116 (described below) of the cushion 106, and is oriented so as to be longitudinal in the vertical direction along the seat back 104. The inflator 108 is electrically connected to the vehicle side, and when a signal originating from the detection of an impact from the vehicle side is received, the inflator 108 operates and supplies gas to the cushion 106.

Examples of inflators that are currently used on a widespread basis include a type that is filled with a gas generating agent and combusts the agent to generate a gas, a type that supplies gas without generating heat by being filled with compressed gas, or a hybrid type that utilizes both combustion gas and compressed gas. Any type of inflator can be used as the inflator 108.

The inflator 108 is provided with two stud bolts 110a and 110b separated in the longitudinal direction thereof. The stud bolts 110a and 110b are exposed to the outside by piercing through a base fabric of the cushion 106, and are fastened and fixed to a frame or the like of the seat back 104. The stud bolts 110a and 110b pierce through the cushion 106 and are fastened to the seat back 104, and thereby the cushion 106 is also attached to the seat back 104.

FIG. 1B is a view illustrating a state after the cushion 106 of FIG. 1A is inflated and deployed. When a sensor provided in the vehicle detects an impact, an operation signal is sent to the inflator 108, gas is discharged, and the cushion 106 uses the gas to exit the covering or the like of the seat cushion 106 and inflate and deploy into the cabin space.

The cushion 106 inflates and deploys into an overall flat shape. The exterior surface of the cushion 106 is configured by a main panel 106a on the left side in the vehicle width direction and a main panel 106b on the right side in the vehicle width direction. The main panels 106a and 106b are made from a base fabric and are formed in an overall bag shape by sewing, adhesion, or the like. Note that the cushion 106 can be formed by weaving using a One-Piece Woven (OPW) fabric or the like.

In the present embodiment, two tethers (first tether 112 and second tether 114) are provided outside of the cushion 106 to suppress oscillation of the cushion 106. The configuration of the cushion 106 will be described further below with focus on the configuration and function of each tether.

FIGS. 2A and 2B are side views of the airbag cushion 106 of FIG. 1B. FIG. 2A illustrates a general overview of the cushion 106. The first tether 112 and the second tether 114 are bridged over the outside of the cushion 106. Each of these tethers is a cloth-like member, and for example, is formed from the same type of base fabric as the main panel 106a and such. The first tether 112 and the second tether 114 are both tensioned when the cushion 106 is inflated and deployed, and apply tension to the cushion 106 to thereby suppress oscillation of the cushion 106.

FIG. 2B is a view with the first tether 112 and the second tether 114 removed from the cushion 106 of FIG. 2A. Prior to describing each tether, each portion of the cushion 106 will be described in detail.

The interior of the cushion 106 is demarcated by a rear chamber 116 and a front chamber 118. The rear chamber 116 is a portion located at the base of the cushion 106, and is formed at a lower part of the vehicle back side. The rear chamber 116 has a vertically long shape along the seat back 104 (see FIG. 1B).

The rear chamber 116 is provided with two bolt holes 120 through which are passed stud bolts 110a and 110b in order to internally provide the inflator 108 (see FIG. 3) described above. The rear chamber 116 has a smaller capacity than the front chamber 118 and rapidly reaches a high pressure state immediately after operation of the inflator 108. The rear chamber 116 rapidly cleaves the covering of the seat back 104 and allows for quicker inflation and deployment of the overall cushion 106.

The first tether 112 is provided outside of the rear chamber 116, and a front end 122 is connected to a front edge portion 124 of the rear chamber 116, and a rear end 126 is connected to a rear part of the rear chamber 116. In the present embodiment, the rear end 126 of the first tether 112 is provided with two bolt holes 128 and is anchored by two stud bolts 110a and 110b at the rear part of the rear chamber 116.

The length of the first tether 112 from the front end 122 to the bolt hole 128 is shorter than a length in the vehicle front-back direction from the front edge portion 124 to the bolt hole 120 when the rear chamber 116 is expanded. This configuration allows the side airbag device 100 to efficiently tension the first tether 112. As a result, the first tether 112 is tensioned in association with the inflation and deployment of the rear chamber 116 to pull the front edge portion 124 of the rear chamber 116 to the rear of the vehicle, thereby suppressing oscillation of the rear chamber 116.

The front chamber 118 is a portion that widely inflates and deploys forward and above from the rear chamber 116, and is formed abutting the front edge portion 124 of the rear chamber 116. The front chamber 118 is inflated and deployed from the seat back 104 to a range in which an occupant in a forward part of the vehicle is present, and actively restrains the occupant.

The second tether 114 is provided outside of the front chamber 118 and the rear chamber 116, and a front end 130 is connected to a front edge portion 132 of the front chamber 118 and a rear end 134 is connected to the rear part of the rear chamber 116. In the present embodiment, the rear end 134 of the second tether 114 is provided with a bolt hole 136, and is anchored by one of the stud bolts 110a and 110b (for example, the stud bolt 110a) at the rear part of the rear chamber 116.

The second tether 114 also has a length in the vehicle front-back direction extending from the front end 130 to the bolt hole 136 of the rear end 134 that is shorter than a length of a path in the vehicle front-back direction extending from the front edge portion 132 of the front chamber 118 to the bolt hole 120 when the inflated and deployed cushion 106 is expanded without being folded. This configuration allows the side airbag device 100 to efficiently tension the second tether 114. Through this, the second tether 114 is tensioned in association with the inflation and deployment of the front chamber 118 and the rear chamber 116 to primarily suppress oscillation of the front chamber 118.

FIG. 3 is a detailed view of the airbag cushion 106 of FIG. 1A, and corresponds to FIG. 1B. A baffle 138 partitioning the rear chamber 116 and the front chamber 118 is provided inside the cushion 106. The baffle 138 is a wall-shaped portion formed using the same type of base fabric as the main panel 106a and the like, and is connected to the main panels 106a and 106b across the vehicle width direction. The baffle 138 is provided with a plurality of vent holes 140 and 142 and other features. The vent holes 140 and 142 are gas distribution ports through which gas passes from the rear chamber 116 side to the front chamber 118 side.

An internal tether 144 is also provided in the cushion 106. The internal tether 144 is also formed using the same type of base fabric as the main panels 106a and 106b, is connected to the main panels 106a and 106b across the vehicle width direction, and regulates the width of the cushion 106 in the vehicle width direction. In addition, a predetermined outer vent (not illustrated) for discharging gas to the outside is also provided in a predetermined location of the cushion 106.

The front end 122 of the first tether 112 can be also be similarly connected to the main panel 106a by sewing, for example, along a location of sewing the baffle 138 to the main panel 106a. The first tether 112 has a shape that is longer in the vertical direction than in the front-back direction, and in particular, the front end 122 is formed with a length that is equal to or greater than a distance D1 between the two stud bolts 110a and 110b. The first tether 112 is short in the vehicle front-back direction, and the front end 122 is also vertically long, and through such a configuration, the first tether 112 can apply a strong tension that pulls the rear chamber 116 to the rear of the vehicle in a wide vertical range, and can thereby suppress oscillation of the rear chamber 116.

The front end 122 of the first tether 112 is connected to a range that includes at least a lower end 146 of the front edge portion 124 of the rear chamber 116. Here, the cushion 106 as a whole inflates and deploys forward and diagonally upward because the inflator 108 is contained within a rearward lower part. At this time, the front end 122 of the first tether 112 supports the lower end 146 of the rear chamber 116, and thereby oscillation of the entire cushion 106 can be efficiently suppressed.

FIG. 4 is an enlarged view near the rear chamber 116 of FIG. 3. The front end 122 of the first tether 112 is connected to a range including locations P1 and P2 of the front edge portion 124 of the rear chamber 116, with the locations P1 and P2 being locations of the shortest distance to the stud bolts 110a and 110b. By configuring the first tether 112 in this manner, the area between the stud bolts 110a and 110b and the front edge portion 124 of the rear chamber 116 is efficiently tensioned, and tension can be efficiently applied to the rear chamber 116 to suppress oscillation.

Reference is made once again to FIG. 3. The second tether 114 is configured to be longer in the front-back direction than in the vertical direction. Through such a configuration, the second tether 114 extends from the stud bolt 110a to the front edge portion 132 of the front chamber 118 and can prevent oscillation of the front chamber 118.

In the present embodiment, the range of connection between the front end 130 of the second tether 114 and the front edge portion 132 of the front chamber 118 is sewn in a much longer range than the range in which the rear end 134 of the second tether 114 connects to the rear part of the rear chamber 116 (the range through which the stud bolt 110a penetrates). With this configuration, when the cushion 106 is inflated and deployed, the second tether 114 can efficiently pull the front edge portion 132 of the front chamber 118 toward the stud bolt 110a side, and can efficiently prevent oscillation of the front chamber 118 and the cushion 106 overall.

FIGS. 5A and 5B are views illustrating the conditions when the airbag cushion 106 of FIG. 1A is inflated and deployed. FIG. 5A is a view of the cushion 106 from the vehicle outer side, and illustrates with a virtual line the movement of a cushion 10 in the vehicle front-back direction. As illustrated in FIG. 5A, the conventional cushion 10 may tilt forward or reactively tilt backwards due to the pressure of gas supplied from the inflator.

The cushion 106 of the present embodiment however is tensioned by the first tether 112, and thereby the rear chamber 116 is supported. The rear chamber 116 is a portion that contains the inflator 108 (see FIG. 3, etc.) and is positioned at the base of the entire cushion 106. The rear chamber 116 is also small in capacity and quickly reaches a high pressure state immediately after operation of the inflator 108. Thus, the first tether 112 is also rapidly and strongly tensioned. Thus, according to the present embodiment, the rear chamber 116 at the base of the cushion 106 is supported with strong tension by the first tether 112, and thereby oscillation in the front-back direction of the overall cushion 106 is prevented, and the restraint performance of the cushion 106 can be increased.

FIG. 5B is a schematic view of the cushion 106 as viewed from above, and illustrates with a virtual line the movement of the cushion 10 in the vehicle width direction. The conventional cushion 10 may also oscillate in the vehicle width direction due to the pressure of the gas. However, in the present embodiment, in addition to the first tether 112 described above, the second tether 114 is tensioned and applies tension to the front chamber 118 to pull the front chamber 118 toward the rear of the vehicle. Accordingly, oscillation of the cushion 106 in the vehicle width direction, and in particular, oscillation in the vehicle width direction originating at the boundary line between the front chamber 118 and the rear chamber 116 can be prevented.

As described above, the side airbag device 100 of the present embodiment can efficiently suppress oscillation of the cushion 106 and improve the restraint performance of the cushion 106 through use of the first tether 112 and the second tether 114. Although the first tether 112 and the second tether 114 are both provided at the occupant side of the cushion 106 in the present embodiment, the tethers thereof may also be provided at the side opposite the occupant, or one may be provided at the occupant side and the other provided at the side opposite the occupant.

Additionally, in the present embodiment, description is given with the assumption that the cushion 106 is provided at the vehicle inner side of the seat back 108. Because there is no support structure for the cushion 106, such as a side door, at the vehicle inner side of the seat back 108, the first tether 112 and the second tether 114, which suppress oscillation, function more favorably. However, the cushion 106 may of course be provided at the vehicle outer side of the seat back 108, and in that case, the first tether 112 and the second tether 114 suppress oscillation, thereby improving the restraint performance of the cushion 106.

FIG. 6 is a view illustrating a modified example of the second tether 114 (second tether 200) of FIG. 2. The second tether 114 is shaped in the form of a band with upper and lower sides that are nearly parallel, while the second tether 200 is shaped such that the vertical width of a front end 202 is wider than a vertical width of a rear end 204, with an upper side 206 and a lower side 208 spread out in a non-parallel manner from the rear end 204 to the front end 202. The second tether 200 of this configuration also allows the front end 202 to be sewn to the front edge portion 132 of the front chamber 118 in a longer range compared to the rear end 204, to thereby efficiently pull the front edge portion 132 toward the rear end 204 side and prevent oscillation of the cushion 106.

Although the second tether 114 of FIG. 2 and the second tether 200 of FIG. 6 are both illustrated as polygonal shapes in the drawings, the second tether is not limited to such a shape, and for example, the function of pulling the front chamber 118 toward the back side can be achieved even with a rounded shape such as an oval not having an angle in the contour. Even with a second tether having such a shape, the front chamber 118 can be efficiently pulled to the rearward side and oscillation of the cushion 106 can be suppressed by connecting the front end side of the second tether to the front edge portion 132 of the front chamber 118 in a range that is longer than the width on the rear end side.

Preferred embodiments of the present invention were described with reference to the appended drawings, however, it goes without saying that the present invention is not limited to such examples. It is clear that a person skilled in the art could conceive of various modifications or revisions within the scope set forth by the claims, and it would be understood that these modifications or revisions would belong to the technical scope of the invention.

Moreover, examples in which the side airbag device according to the present invention was applied in a vehicle were described in the embodiments above, however, the present invention can also be applied to airplanes, ships, and other applications in addition to vehicles, and the same operations and effects can be obtained.

INDUSTRIAL APPLICABILITY

The present invention can be used in a side airbag device that restrains a vehicle occupant from a side.

The invention claimed is:
1. A side airbag device comprising:
a vertically long rear chamber that inflates and deploys from a side portion of a vehicle seat;
a front chamber that abuts a front edge portion of the rear chamber and inflates and deploys forward and upward from the rear chamber;
a vertically long inflator contained within a rear part of the rear chamber; and
a first tether that is provided outside of the rear chamber, has a front end connected to the front edge portion of the rear chamber and a rear end connected to the rear part of the rear chamber at the rear part of the rear chamber, and is tensioned when the rear chamber is inflated and deployed;

wherein:

the rear chamber has a smaller capacity than the front chamber; and the first tether is longer in a vertical direction than in a front-back direction.

2. The side airbag device according to claim 1, further comprising a second tether that is provided outside of the front chamber and the rear chamber, has a front end connected to a front edge portion of the front chamber and a rear end connected to the rear part of the rear chamber, and is tensioned when the rear chamber is inflated and deployed.

3. The side airbag device according to claim 2, wherein the second tether is longer in the front-back direction than in the vertical direction.

4. The side airbag device according to claim 3, further comprising two stud bolts provided longitudinally spaced apart at the inflator, exposed from the rear chamber, and fastened to the vehicle seat;

wherein the rear end of the first tether is anchored to the rear part of the rear chamber across the two stud bolts.

5. The side airbag device according to claim 3, further comprising two stud bolts provided longitudinally spaced apart at the inflator, exposed from the rear chamber, and fastened to the vehicle seat;

wherein the rear end of the second tether is anchored by at least one of the two stud bolts at the rear part of the rear chamber.

6. The side airbag device according to claim 2, further comprising two stud bolts provided longitudinally spaced apart at the inflator, exposed from the rear chamber, and fastened to the vehicle seat;

wherein the rear end of the second tether is anchored by at least one of the two stud bolts at the rear part of the rear chamber.

7. The side airbag device according to claim 2, wherein the second tether overlaps the first tether in a lateral direction.

8. The side airbag device according to claim 1, further comprising two stud bolts provided longitudinally spaced apart at the inflator, exposed from the rear chamber, and fastened to the vehicle seat;

wherein the rear end of the first tether is anchored to the rear part of the rear chamber across the two stud bolts.

9. The side airbag device according to claim 8, wherein the front end of the first tether has a length greater than or equal to a distance between the two stud bolts.

10. The side airbag device according to claim 9, wherein the front end of the first tether is connected to a range of the front edge portion of the rear chamber, the range including a location of the shortest distance to the stud bolts.

11. The side airbag device according to claim 8, wherein the front end of the first tether is connected to a range of the front edge portion of the rear chamber, the range including a location of the shortest distance to the stud bolts.

12. The side airbag device according to claim 1, further comprising two stud bolts provided longitudinally spaced apart at the inflator, exposed from the rear chamber, and fastened to the vehicle seat;

wherein the rear end of the first tether is anchored to the rear part of the rear chamber across the two stud bolts.

13. The side airbag device according to claim 1, further comprising two stud bolts provided longitudinally spaced apart at the inflator, exposed from the rear chamber, and fastened to the vehicle seat;

wherein the rear end of the first tether is anchored to the rear part of the rear chamber across the two stud bolts.

14. The side airbag device according to claim 1, further comprising two stud bolts provided longitudinally spaced apart at the inflator, exposed from the rear chamber, and fastened to the vehicle seat;

wherein the rear end of the first tether is anchored to the rear part of the rear chamber across the two stud bolts.

15. The side airbag device according to claim 1, wherein the rear chamber has an L-shape with a first leg downwardly extending along a rear side of the airbag.

16. The side airbag device according to claim 15, further comprising two stud bolts provided longitudinally spaced apart at the inflator and exposed from the rear chamber for fastening to the vehicle seat, the rear end of the first tether anchored to the rear part of the rear chamber across the two stud bolts, a first stub bolt of the two stud bolts passing through the first leg of the rear chamber.

17. A side airbag device comprising:

a vertically long rear chamber that inflates and deploys from a side portion of a vehicle seat;

a front chamber that abuts a front edge portion of the rear chamber and inflates and deploys forward and upward from the rear chamber;

a vertically long inflator contained within a rear part of the rear chamber; and a first tether that is provided outside of the rear chamber, has a front end connected to the front edge portion of the rear chamber and a rear end connected to the rear part of the rear chamber at the rear part of the chamber, and is tensioned when the rear chamber is inflated and deployed; and a second tether that is provided outside of the front chamber and the rear chamber, has a front end connected to a front edge portion of the front chamber and a rear end connected to a rear part of the rear chamber, and is tensioned when the rear chamber is inflated and deployed.

18. A side airbag device comprising:

a vertically long rear chamber that inflates and deploys from a side portion of a vehicle seat;

a front chamber that abuts a front edge portion of the rear chamber and inflates and deploys forward and upward from the rear chamber;

a vertically long inflator contained within a rear part of the rear chamber; and a first tether that is provided outside of the rear chamber, has a front end connected to the front edge portion of the rear chamber and a rear end connected to the rear part of the rear chamber at the rear part of the chamber, and is tensioned when the rear chamber is inflated and deployed; and two stud bolts provided longitudinally spaced apart at the inflator, exposed from the rear chamber, and fastened to the vehicle seat;

wherein the rear end of the first tether is anchored to the rear part of the rear chamber across the two stud bolts.

* * * * *